(No Model.)
S. P. FRALEY.
Broom.
No. 230,541.  Patented July 27, 1880.
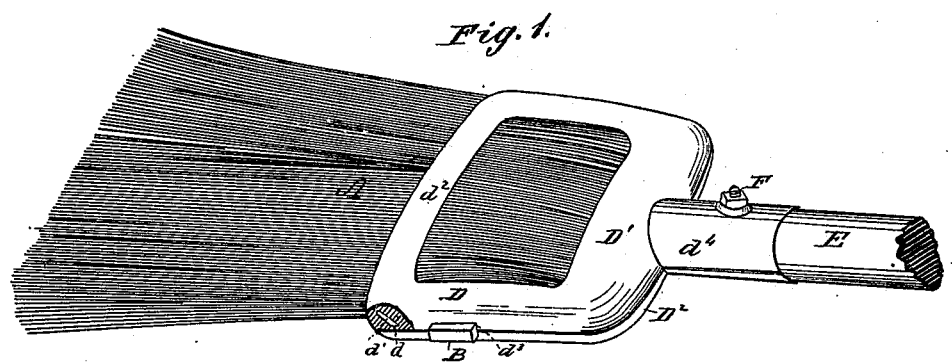
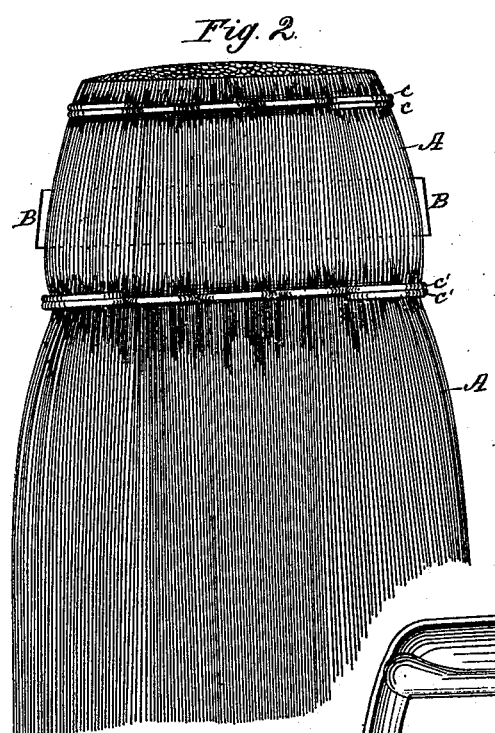
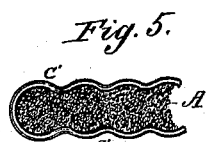
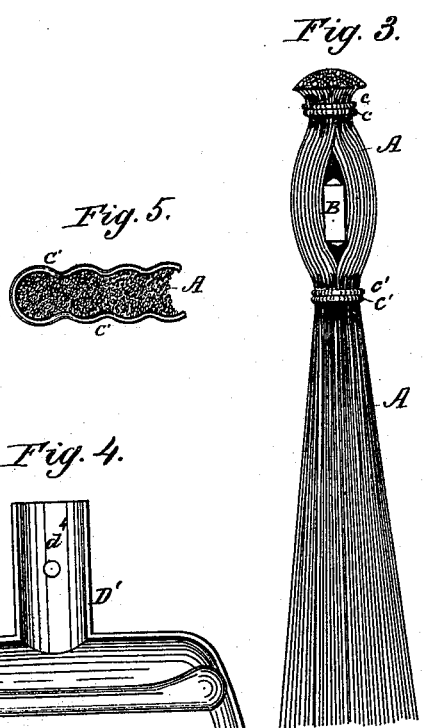
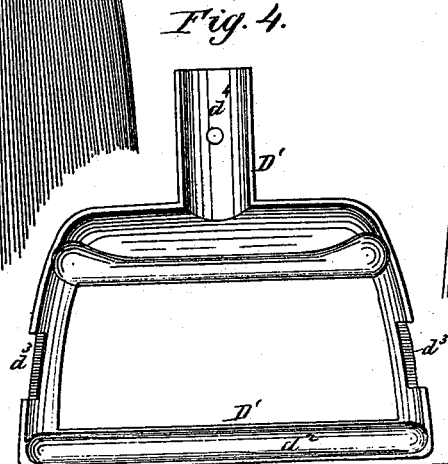
WITNESSES:
W. W. Hollingsworth
Solon C. Kemon
INVENTOR:
S. P. Fraley
BY
ATTORNEYS.
N. PETERS, PHOTO-LITHOGRAPHER, WASHINGTON, D. C.

UNITED STATES PATENT OFFICE.

SAMUEL P. FRALEY, OF COLUMBUS, OHIO.

BROOM.

SPECIFICATION forming part of Letters Patent No. 230,541, dated July 27, 1880.

Application filed May 20, 1880. (No model.)

*To all whom it may concern:*

Be it known that I, SAMUEL P. FRALEY, of Columbus, in the county of Franklin and State of Ohio, have invented a new and Improved Broom-Brush; and I do hereby declare that the following is a full, clear, and exact description of the same.

The object of my invention is to form a broom-brush in such manner that it may be cheaply made by mechanical means and will be held together independently of the holder and handle without the use of stitches, and may be readily connected to the handle by means of an improved holder in a peculiar manner.

My invention consists, first, in placing a bar of wood transversely between two layers of broom-straw near their stub-ends and then clamping the straw upon each side of the bar tightly between dies, while tie-wires of peculiar form are compressed around all sides of the straw above and below the transverse bar, after which the pressure may be relieved and the broom-brush will be ready for attachment to the handle.

My invention further consists in a broom-brush formed, substantially as described, with a transverse bar arranged between the layers of straw, that are clamped together upon each side of the bar in such manner that the ends of the bar will protrude slightly from the straw to provide means for attaching the broom-brush to a holder formed of two sections hooked together at their lower ends and formed with notches in their faces, which embrace the projecting ends of the transverse bar, the upper ends of the holder being provided with clips that embrace the end of the handle and are clamped upon it by a bolt and nut.

My invention further consists in corrugating the tie-wires in a peculiar manner, in order that they will indent the layers of straw at intervals, by which means the straw is prevented from slipping beneath the wires and is bound more closely together, all of which will appear more clearly from the following description.

In the accompanying drawings, Figure 1 is a perspective view of a broom made according to my invention. Fig. 2 is a side elevation of a broom-brush detached, with the transverse bar shown in dotted lines; Fig. 3, an end view of the same; Fig. 4, a plan view of the inner face of one of the holders; Fig. 5, a sectional detail at the end of tie-wires.

The broom-brush A is formed by taking two layers of broom-straw of suitable width and thickness and placing between them a rectangular bar of wood, B, arranged transversely to the broom-brush, so that the straw will cross the bar above and below it. The straw and bar thus arranged are placed between suitable clamping-jaws, which are provided with means for compressing it. Tie-wires C C, of sufficient length to project several inches beyond each end of the broom-brush, are placed in suitable recesses in the clamping-jaws upon both sides of the brush, above the bar B, and similar wires $C'$ are placed in a like manner below the said bar B, and are closely pressed against the straw by the clamping-jaws. The projecting ends of the wire are then caught between plates and bent round the ends of the brush-blank and tightly compressed against the opposite sides of the straw layers, by which means the straw is securely bound around the bar B and prevented from slipping and becoming loose. The wires are waved or corrugated as they are pressed against the straw by the shape and pressure of the clamping-jaws in such manner that the undulations will indent the straw and hold it more closely together to resemble somewhat the binding pressure of the stich. The curved form given the straw in passing around the bar B and the firm inelastic pressure of the tie-wires will hold the straw together more firmly than stitches and will not break and become loose.

The broom-brush above described may be more rapidly made by machinery than the old form of brush by the process of stitching. By this means short pieces of stub-ends of straw, heretofore thrown away, may be used for making stable or scrub brooms, as the stability of the brush is not lessened by using short straw.

The broom-brush is preferably attached to the handle by means of a holder, D, formed of two similar sections, $D'$ $D^2$. The lower or brush ends of the sections are hinged together by an inclined pin, $d$, upon section $D'$, that passes into a similarly-inclined hole, $i$, in the section $D^2$, which, when the sections are together, form a hinge or interlocking joint.

The sections of the holder each have a recessed cross-piece, $d^2$, that covers over the tie-wire $c'$ beneath it, and serves to protect the wire and also to give a finish to the broom. The upper wire C and stub-end of the brush are also covered over by the upper portion of the holder for like purpose.

The side pieces of the holder are notched at $d^3$ to embrace the projecting ends of the bar B and secure them firmly in place. The upper and middle portions of the holder sections are provided with clips $d^4$ to fit snugly around the handle E of the broom, and are secured thereto by a bolt, F, that passes through the clips and handle, a head upon one end of the bolt and a nut upon the other end serving to readily connect and disconnect the parts. By this means the brush-holder and handle are readily secured together by simple means.

If the handle is broken a new one may be readily substituted by the most unskilled person.

The brush may be worn down close to the wires without danger of becoming loose, and the broom will retain its elasticity until it is nearly worn out for the same reason. When it has been worn down too far to be used as a sweeping-broom it may be used as a scrubbing-broom until it is entirely worn out without danger of coming to pieces.

The broom-brush thus formed may become an article of separate manufacture and sale, as the holder will outlast many brushes.

The broom-brushes may be closely packed for transportation, and may be placed in the market at a much lower price than a complete broom stitched and permanently wrapped to the handle with wire.

I claim as my invention and desire to secure by Letters Patent—

1. A broom-brush formed of layers of straw secured to opposite sides of a transverse bar by rows of stitches or tie-wires that bind the straw close to the upper and lower edges of the bar in such manner that the bar will extend from one side of the brush to the other transversely to the length of the straw, and serve to spread it between the bound portions, and afford means for attaching the brush to the handle, substantially as described.

2. A broom formed of the combination of the handle E, clamped to a holder, D, that embraces the stub-end of brush A, and is provided with recesses that interlock with the projecting ends of a bar, B, that passes transversely through the broom-brush, substantially as and for the purpose specified.

3. A broom-brush formed of layers of straw bound together by tie-wires arranged upon opposite sides of the bar and crimped to bind the straw in a wave line, substantially as and for the purpose specified.

S. P. FRALEY.

Witnesses:
SOLON C. KEMON,
CHAS. A. PETIT.